March 10, 1931. J. DOMS ET AL 1,796,192
HEADLIGHT OPERATING MECHANISM FOR MOTOR CARS AND THE LIKE
Filed Feb. 18, 1929 3 Sheets-Sheet 2
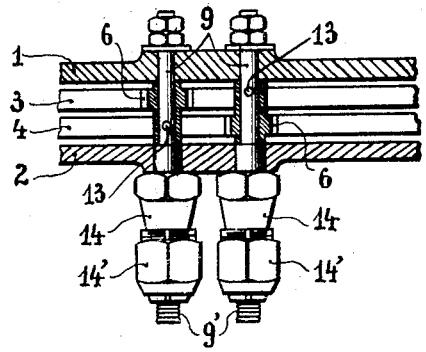
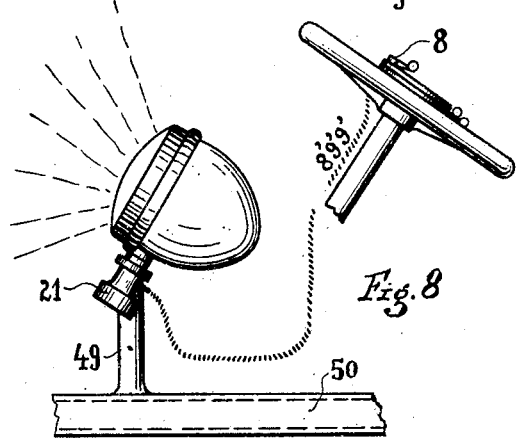
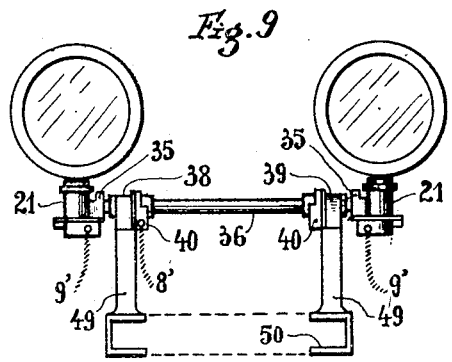
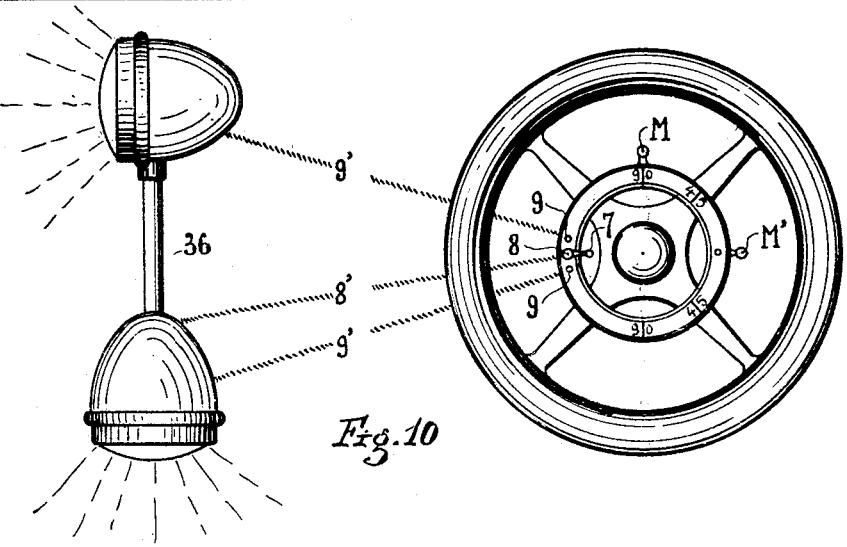
Jules Doms, Hubert Wolter, Raoul Simon Inventors
Attorneys

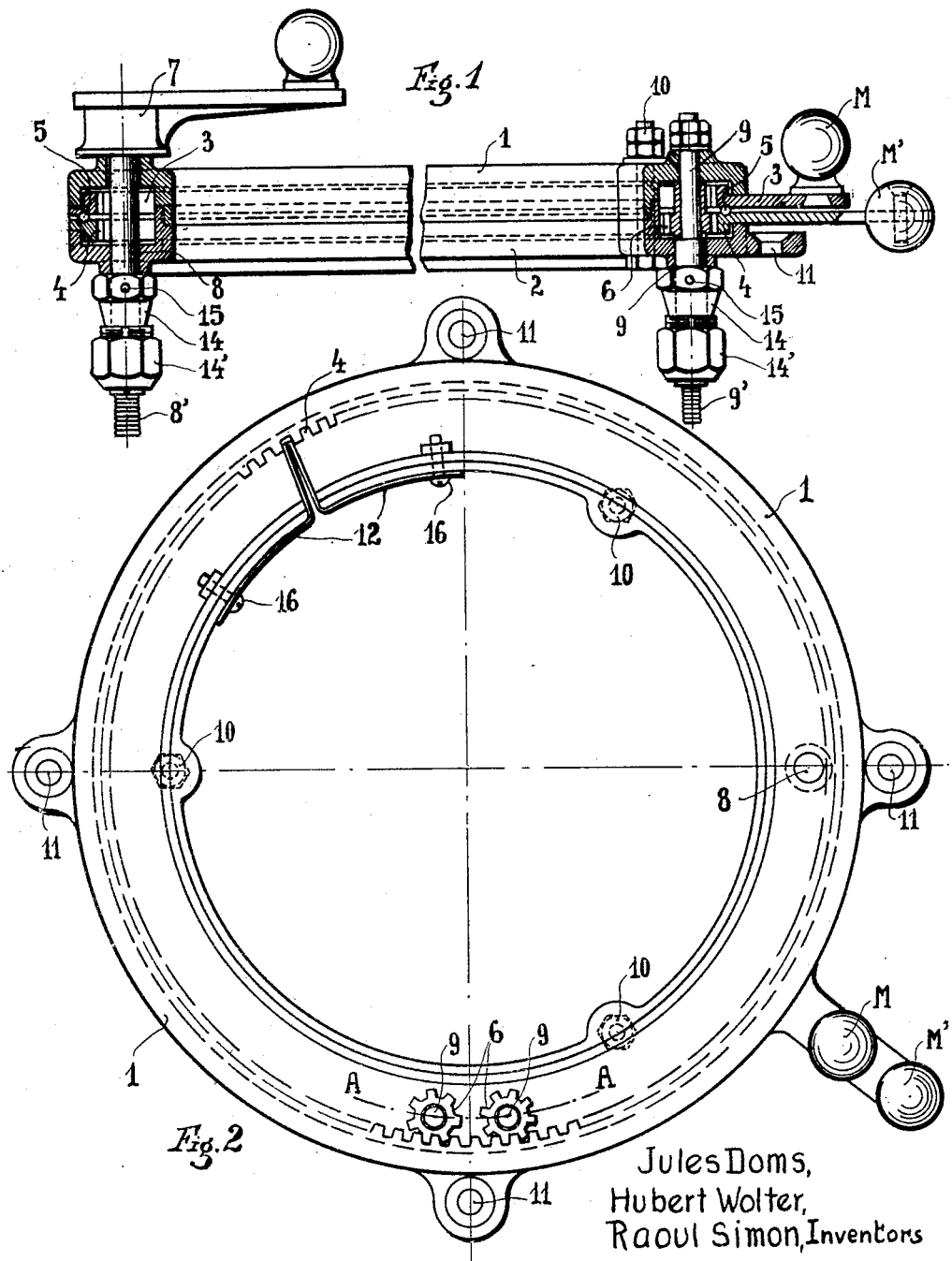

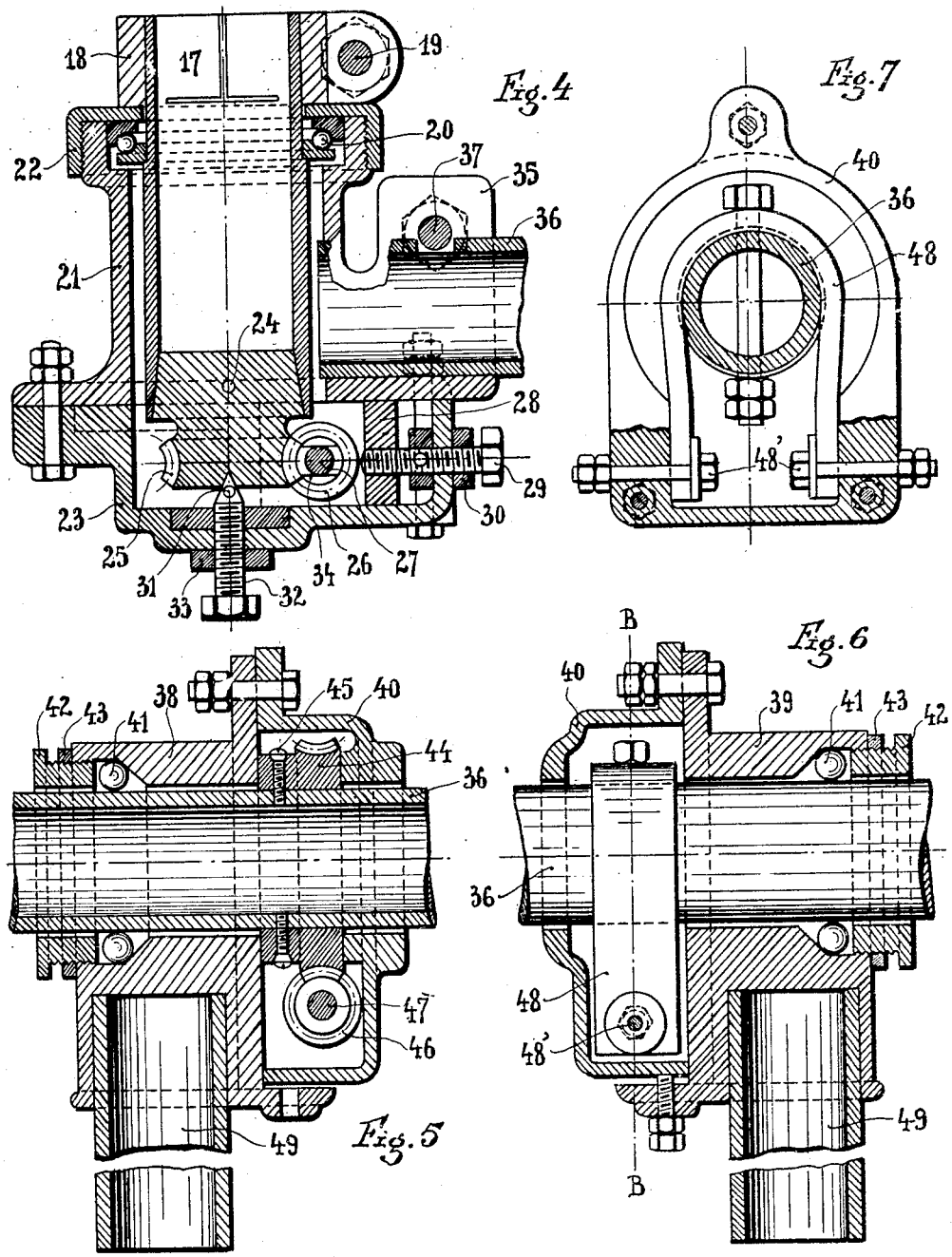

Patented Mar. 10, 1931

1,796,192

UNITED STATES PATENT OFFICE

JULES DOMS, HUBERT WOLTER, AND RAOUL SIMON, OF BRUSSELS, BELGIUM

HEADLIGHT-OPERATING MECHANISM FOR MOTOR CARS AND THE LIKE

Application filed February 18, 1929, Serial No. 340,869, and in Belgium February 24, 1928.

This present invention relates to headlight operating mechanisms for motor-cars and the like in which the headlights may be operated individually or simultaneously in horizontal and vertical planes from the driver's seat by means of three handles.

The object of the invention is to provide a mechanism of this type in which the rotation of the headlights in a horizontal plane is effected by means of two gear-wheels co-operating with flexible shafts and superimposed on ball bearings within a bipartite casing concentrically arranged on the steering hand wheel, each of said gear wheels being provided with a suitable handle, whilst the rotation of the headlights in vertical planes is effected by means of a crank arranged on said casing and acting directly on another flexible shaft, the movements of all the flexible shafts being transmitted to the headlights by means of worm gearings.

The invention is illustrated in the accompanying drawings wherein:

Fig. 1 is a vertical section of the headlight operating device proper.

Fig. 2 is a top plan view thereof.

Fig. 3 is a section on line A—A of Fig. 2.

Fig. 4 is a vertical section of the headlight supporting device, whilst

Fig. 5 shows a vertical section of the left hand side bearing of the rotary horizontal shaft supporting the headlights.

Fig. 6 is a vertical section of the corresponding right hand side bearing.

Fig. 7 is a section on line B—B of Fig. 6.

Figs. 8, 9 and 10 show an elevation and top plan view of the arrangement of the mechanism on the frame and steering hand wheel of a motor-car.

The headlight operating device (Figs. 1–3) is preferably arranged on the steering hand wheel (Fig. 10), though it may also be arranged at any other place (for instance on the instrument board) in the reach of the driver.

Said device comprises a bipartite annular flat casing 1, 2, within which an upper gear wheel 3 and a lower gear wheel 4 are journaled on ball bearings 5. Each gear wheel 3, 4 meshes with a toothed pinion 6 secured by means of a pin 13 on an axle 9, each axle 9 being connected to a flexible shaft 9′ by means of a nut provided with a conical or bevelled extension 14 (Figs. 1, 3), said flexible shaft 9′ extending to the corresponding headlight to operate the same in a horizontal plane. Each gear wheel 3, 4 has a laterally or otherwise arranged handle M, M′ respectively. A crank 7 is attached to the upper projecting end of an axle 8 extending vertically through the casing 1, 2 and connected to another flexible shaft 8′, said crank serving to operate the headlights in vertical planes.

The two parts of the casing 1, 2 are connected together by means of bolts, whilst the whole casing is secured to the steering hand wheel by means of screws extending through holes 11 in the part 1 of the casing. The two gear wheels 3, 4 are each locked in any adjusted position by means of a particular spring blade 12 attached outside the casing by means of screws 16.

The connection between the rigid axles 8, 9 and corresponding flexible shafts 8′, 9′ comprises a nut screwed onto the axle 8 or 9 and locked by means of a pin 15, said nut having a conical or bevelled extension 14. Secured in said extension is the end of the flexible shaft 8′ or 9′ by means of a locking nut 14′ screwed onto said bevelled extension 14, which is preferably slotted longitudinally. Owing to said slots or by inserting a suitable nipple, flexible shafts of different diameters may be connected to the same extension.

Each headlight is seated with its depending extension within a vertical tube section 17 and securely held therein by means of a collar 18 provided with tightening bolts 19 (Fig. 4). The tube section 17 is journaled by means of a ball bearing 20 within a sleeve shaped casing 21, closed at the top by means of a screwed cover 22 and at the bottom by means of a bottom plate 23 attached by means of bolts. Attached by means of a pin 24 to the lower end of the tube section 17 is a worm gear 25 meshing with a worm 26 on a horizontal shaft 27 arranged in a bearing 28 movably arranged on the bottom plate 23 and adjustable by means of an adjusting screw 29 and nut 30, whereby the operating parts may be easily adjusted according to the wear thereof. The central part of the worm-gear 25 is supported on a ball 31 journaled in a recess in the adjusting screw 32. Arranged in the side walls of the casing 21 are longitudinal slots 34 in which the shaft 27 is slidably arranged. The shaft 27 is connected to the flexible shaft 9′ extending from the axle 9 (Figs. 1–3) by means of a connection similar to the connection 14 previously described.

On one side the casing 21 has a collar 35 in which one end of a horizontal tube 36 is secured by means of a bolt 37, the opposite end of said tube being secured in a similar collar of the casing supporting the other headlight. The tube 36 is journaled on balls 41 in two bearings 38 (Fig. 5) and 39 (Fig. 7) arranged at the front of the car on supporting posts 49, secured to the frame 50 of the car. Each bearing is closed on one side turned towards the centre of the car by means of a casing 40 attached by means of bolts. The balls 41 are held in place by means of a cup 42 adjustable from the outside and locked by means of a nut 43. Attached by means of a screw 45 to the tube 36 within the casing 40 of one of the bearings, for instance the left hand bearing, is a worm-gear 44 co-operating with a worm 46 arranged on shaft 47 actuated by the flexible shaft 8′, said gearing being operated by means of the crank 7 (Fig. 1). Extending around the tube 36 within the casing 40 of the second bearing is a flexible band or spring 48, both ends of which are attached by means of bolts 48′ to the inner walls of the casing 40. This device serves to securely hold the rotary tube 36 in any adjusted position.

The headlights may be similarly arranged on the mud guards of the front wheels.

The two handles M, M′ being arranged above each other as in Figure 2 for the normal position of the headlights, said handles M, M′ will practically constitute a single handle only, which upon its movement in either direction will impart equal movements to both headlights. By actuating each individual handle M or M′ the two headlights may be rotated individually in different and even opposite directions.

Moreover the transmission of movements is effected in such a way that each movement of a handle will produce an exactly equal movement of the corresponding headlight, whereby both movements will be perfectly uniform. For instance if a handle is moved through an angle of 90°, the corresponding headlight will also be rotated through an angle of 90°.

The mechanism described enables the headlights to be adjusted simultaneously in horizontal and vertical planes.

Having fully described our invention, what we claim is:—

1. In a headlight operating mechanism for motor-cars and the like, the combination with the headlights and the steering hand wheel, of a bipartite casing arranged concentrically on said steering wheel, gear wheels arranged above each other in said casing on ball bearings, a suitable operating handle on each gear wheel, flexible shafts actuated by said gear wheels and extending to the headlights to operate the same in horizontal planes, a crank arranged on the casing, a flexible shaft extending from said crank to the headlights to move the same in vertical planes, and means for transmitting the movements of said flexible shafts to the headlights, substantially as set forth.

2. In a headlight operating mechanism for motor-cars and the like, the combination with the headlights and the steering hand wheel, of a bipartite casing arranged concentrically on said steering wheel, gear wheels arranged above each other in said casing on ball bearings, a suitable operating handle on each gear wheel, toothed pinions on rigid axles meshing with said gear wheels, flexible shafts connected to said toothed pinions and extending to the headlights to move the same in horizontal planes, a suitable spring engaging the teeth of the gear wheels to lock the same in adjusted positions, a crank arranged on the casing, a flexible shaft extending from said crank to the headlights to move the same in vertical planes and means for transmitting the movements of said flexible shafts to the headlights, substantially as set forth.

3. In a headlight operating mechanism for motor-cars and the like, the combination with the headlights and the steering hand wheel, of a bipartite casing arranged concentrically on said steering wheel, gear wheels arranged above each other in said casing on ball bearings, a suitable operating handle on each gear wheel, toothed pinions on rigid axles meshing with said gear wheels, flexible shafts connected to said toothed pinions and extending to the headlights to move the same in horizontal planes, a suitable spring engaging the teeth of the gear wheels to lock the same in adjusted positions, a crank arranged on the casing, a flexible shaft extending from said crank to the headlights to move the same in vertical planes, a nut screwed onto the end of each pinion carrying axle, a hollow bevelled extension on said nut for the reception of the end of the flexible shaft to be connected thereto, and a locking nut screwed onto said bevelled extension, substantially as set forth.

4. In a headlight operating mechanism the combination with the steering hand wheel and headlights, of sleeve shaped casings for the reception of the depending extensions of the headlights, means for journaling said extensions in said casings, a worm-gear attached to the lower end of each extension, a worm meshing with said worm gear, a horizontal shaft carrying said worm, slidable bearings for said shaft, an adjusting screw for adjusting said bearings according to the wear of the gearing, and means arranged on the steering hand wheel for operating the headlights, substantially as set forth.

In testimony whereof, we affix our signatures.

JULES DOMS.
HUBERT WOLTER.
RAOUL SIMON.